B. H. JONES.
ASSEMBLING TOOL.
APPLICATION FILED SEPT. 14, 1911.
1,013,171.
Patented Jan. 2, 1912.
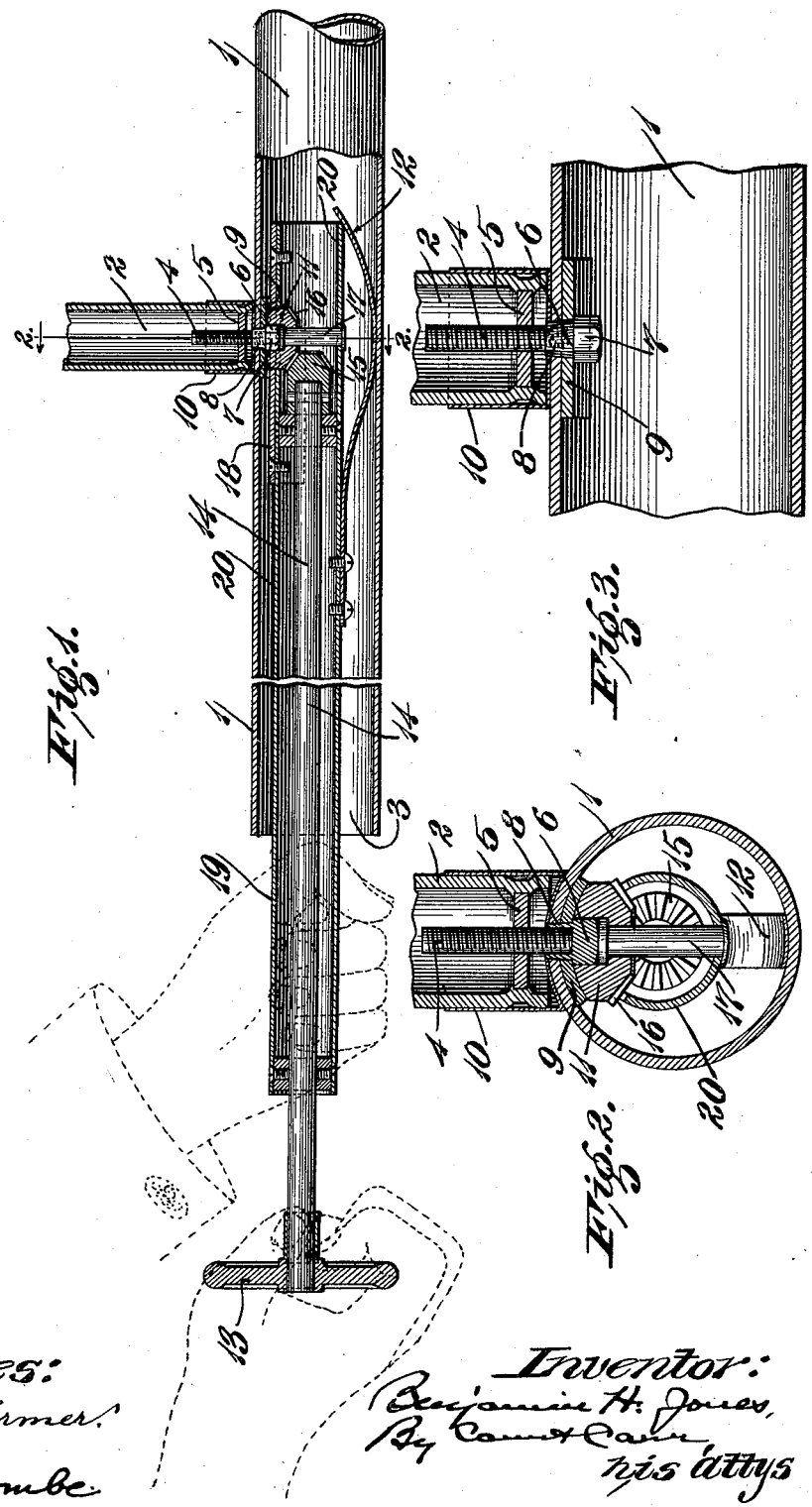

UNITED STATES PATENT OFFICE.

BENJAMIN H. JONES, OF ST. LOUIS, MISSOURI.

ASSEMBLING-TOOL.

1,013,171.  Specification of Letters Patent.  Patented Jan. 2, 1912.

Application filed September 14, 1911. Serial No. 649,311.

*To all whom it may concern:*

Be it known that I, BENJAMIN H. JONES, a citizen of the United States, and a resident of the city of St. Louis and State of Missouri, have invented a new and useful Improvement in Assembling-Tools, of which the following is a specification.

My invention relates to the assembling of metal bed frames and similar articles made of tubing, and has for its object an improved means for making up "blind joints" in the construction of such articles.

Heretofore it has been very difficult to securely fasten together the cross rods and rails or posts in such a way that the fastening means shall be entirely concealed within the tubes forming the rods and rails or posts, particularly where the joint between the end of the cross rod and side of the rail is at a considerable distance from the end of the rail. In such cases special forms of fastening means have been resorted to most of which are more or less complicated and not over secure. By means of my improved device, "blind joints" may be made up at any distance from the end of the rail, however inaccessible, with as great facility as where the joint is at the end of the rail in full view and within easy reach of the fingers or ordinary tools.

One form of my improvement is illustrated in the accompanying drawings, in which like characters designate like parts throughout the several views, and in which—

Figure 1 is a sectional view of my device in operation, the end of the rail and cross rod being shown in section in assembled position; Fig. 2 is a transverse section through the joint shown in Fig. 1, showing the tool in section on the line 2—2 of Fig. 1; and Fig. 3 is an enlarged sectional view of the joint shown in Fig. 1, the tool being removed.

Referring to the drawings, my improvement consists in connecting a rail 1 and cross rod 2, butting against the side thereof at some distance from its open end 3, by means of a threaded stud 4, screwed in a pommel 5 fixed in the end of the cross rod, and rail knob 6 having a hexagon head 7 and conical body portion 8 fitting in tapered holes in the rail 1 and reinforce 9, and screwed up hard on the stud 4 to secure the end of the cross rod firmly to the rail. On the end of the cross rod is arranged a ferrule 10, shaped to embrace the side of the rail to cover up any gap between the parts and make a neat appearing joint.

In making up the joint the pommel 5 is secured in the end of the cross rod, and the stud 4 is screwed partly into it after which the ferrule 10 is slipped on the end of the cross rod, the end of the stud projecting through it. The nut 6 is placed in the socket 11 rotatably mounted on the pin 17 of the tool 20, and the reinforcing piece 9 arranged thereon, after which the tool is inserted in the open end of the rail far enough for the nut to register with the hole in the side of the rail, whereupon the spring 12 will push the end of the tool toward the hole and project the conical end of the nut through it. No difficulty is found in placing a nut in a hole in the side of the rail four to six feet from the open end thereof by this means. The next operation is to bring the threaded stud in the end of the cross rod into engagement with the nut, and screw it up as far as convenient by rotating the cross rod or the stud with the fingers, after which the nut is screwed home by means of the hand wheel 13 on the end of the shaft 14 journaled at its ends in the tool 20, and carrying at its inner end a bevel gear 15 meshing with a similar bevel gear 16 formed on the back side of the socket 11. The inner end of the tool 20 is reinforced with a plate 18 to assist in holding the socket 11 in alinement, and the outer end 19 of the tool forms a convenient handle for manipulating it in the open end of the rail.

While I have described a particular form of tool for carrying out my invention, I do not wish to be limited to the precise form shown, but What I desire to secure by Letters Patent is as follows:

1. In a tool for making up blind joints in tubular frames, a body portion provided with a handle at one extremity, a socket member adjacent the other extremity arranged to rotate on an axis transverse to the longitudinal axis of the tool, a spring arranged to bear against the inner wall of the frame members opposite said socket member, and means for rotating the socket member from adjacent said handle.

2. In a tool for making up blind joints in tubular frames, a body portion provided with a handle at one extremity, a socket member adjacent the other extremity arranged to rotate on an axis transverse to the longitudinal axis of the tool, a spring arranged to bear against the inner wall of the frame members opposite said socket member, and means for rotating the socket member from adjacent said handle, said means comprising a longitudinal shaft rotatably mounted in said body portion and provided with a handle on its outer end and a bevel gear on its inner end, and said socket member comprising a bevel gear adapted to mesh with said first named bevel gear.

3. In a tool for making up blind joints in tubular frames, a body portion provided with a handle at one extremity, a socket member adjacent the other extremity arranged to rotate on an axis transverse to the longitudinal axis of the tool, said socket member being located substantially within said body portion and having a convex face projecting without said body portion, said projecting face comprising an axial recess, adapted to receive a nut and reinforce for positioning the same in said tubular frame, and means for rotating the socket member from adjacent said handle, said tool being adapted to enter a tube too small to admit the hand.

4. In a tool for making up blind joints in tubular frames, a body portion substantially uniform in size throughout its length and provided with a handle at one extremity, a socket member located substantially within said body portion adjacent the other extremity and arranged to rotate on an axis transverse to the longitudinal axis of the tool, and means for rotating the socket member from adjacent said handle, said tool being adapted to enter a tube too small to admit the hand.

Signed at St. Louis, Missouri, this 12th day of September, 1911.

BENJAMIN H. JONES.

Witnesses:
A. M. HOLCOMBE,
M. A. SHELTON.

Copies of this patent may be obtained for five cents each, by addressing the "Commissioner of Patents, Washington, D. C."